(12) United States Patent
Schneider et al.

(10) Patent No.: US 9,835,849 B2
(45) Date of Patent: Dec. 5, 2017

(54) IMAGE GATING USING AN ARRAY OF REFLECTIVE ELEMENTS

(71) Applicant: Elbit Systems Ltd., Haifa (IL)

(72) Inventors: Ron Schneider, Haifa (IL); Eyal Zohar, Tzurit (IL)

(73) Assignee: Elbit Systems Ltd., Haifa (IL)

(*) Notice: Subject to any disclaimer, the term of this patent is extended or adjusted under 35 U.S.C. 154(b) by 0 days.

(21) Appl. No.: 13/625,178

(22) Filed: Sep. 24, 2012

(65) Prior Publication Data

US 2013/0077142 A1    Mar. 28, 2013

Related U.S. Application Data

(60) Provisional application No. 61/539,487, filed on Sep. 27, 2011.

(30) Foreign Application Priority Data

Sep. 26, 2011    (GB) .................................. 1116474.6

(51) Int. Cl.
*G02B 26/08* (2006.01)
*G01S 7/481* (2006.01)
(Continued)

(52) U.S. Cl.
CPC ............ *G02B 26/08* (2013.01); *G01S 7/4816* (2013.01); *G01S 17/107* (2013.01); *G01S 17/89* (2013.01); *G02B 26/0833* (2013.01)

(58) Field of Classification Search
CPC ................ G02B 26/08; G02B 26/0816; G02B 26/0833–26/0866; G02B 17/002;
(Continued)

(56) References Cited

U.S. PATENT DOCUMENTS 6,069,352 A    5/2000   Castracane et al.
6,464,633 B1   10/2002  Hosoda et al.
(Continued)

FOREIGN PATENT DOCUMENTS

JP    2011015103       1/2011
WO    2007/065153 A2   6/2007
WO    WO 2010/124038   10/2010

OTHER PUBLICATIONS

Written Opinion of the International Searching Authority of PCT/IB2012/055055 dated Jan. 22, 2013 retrieved electronically from WIPO May 13, 2014.*

(Continued)

*Primary Examiner* — Thomas K Pham
*Assistant Examiner* — Cara Rakowski
(74) *Attorney, Agent, or Firm* — Pearl Cohen Zedek Latzer Baratz LLP (57) ABSTRACT

A device for image gating using an array of reflective elements is provided herein. The device includes an array of reflective elements, wherein each one of the reflective elements is movable within a range of a plurality of tilt positions, wherein the array is located at an image plane of the device, wherein the array is perpendicular to an optical axis of the device. The device further includes a control unit configured to control the reflective elements such that in at least some of the tilt positions, the reflective elements reflect the radiant flux at said image plane, to one or more projection planes. A gradual rotation of the reflective elements along the plurality of tilt positions result in a gradual increase or decrease in the intensity of the image reflected from the array of reflective elements while maintaining the image integrity.

7 Claims, 7 Drawing Sheets

(51) Int. Cl.
*G01S 17/10* (2006.01)
*G01S 17/89* (2006.01)

(58) Field of Classification Search
CPC .......... G01S 17/06; G01S 17/08; G01S 17/10; G01S 17/107; G01S 17/89; G01S 7/4816
USPC ......... 359/198.1–199.4, 200.6–200.8, 202.1, 359/221.2, 223.1–225.1, 226.2, 904, 359/290–295, 838, 846, 871, 872; 250/204, 559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | |
|---|---|---|
| 7,224,384 B1 | 5/2007 | Iddan et al. |
| 7,319,219 B2 | 1/2008 | David et al. |
| 2005/0270528 A1 | 12/2005 | Geshwind et al. |
| 2006/0060758 A1 | 3/2006 | David et al. |
| 2006/0114543 A1 | 6/2006 | Bloom |
| 2007/0058038 A1* | 3/2007 | David et al. .................. 348/135 |
| 2007/0216769 A1* | 9/2007 | Zganec .................. G01S 7/497 348/139 |
| 2009/0207412 A1 | 8/2009 | Mahmood et al. |
| 2012/0228482 A1* | 9/2012 | Lin ...................... G01J 1/0414 250/216 |

OTHER PUBLICATIONS

International Search Report of Application No. PCT/IB2012/055055 dated Jan. 22, 2013.
Combined Search and Examination Report issued by the UKIPO dated Jan. 23, 2012 for GB1116474.6.
Extended European Search Report of EP Application No. 12837338.8, dated Jun. 3, 2015.

* cited by examiner

IMAGE GATING USING AN ARRAY OF REFLECTIVE ELEMENTS

CROSS REFERENCE TO RELATED APPLICATIONS

The present application claims priority from U.S. provisional application No. 61/539,487 filed on Sep. 27, 2011 and from UK application No. GB1116474.6 filed on Sep. 26, 2011 which are incorporated herein by reference in their entirety.

BACKGROUND

1. Technical Field

The present invention relates to gated systems, and more particularly, to such systems that employ an array of reflective elements for implementing the gating.

2. Discussion of Related Art

Active gated systems are known in the art for achieving an enhanced image of a scene in high scattering or absorption media. Gated systems are used when there is a clear advantage for a reflective image rather than a thermal (emitted) image. Since the human eye is used to perceiving a reflected image and the human brain is accustomed to process reflected images, it is easier to interpret reflected images.

Thermal imagers are associated to emitted image formed by the collection of the photons emitted from the observed target. There are certain features in an image that one can observe only by using the reflected image and equally there are such that can be achieved only by using the emitted image.

Active imaging benefits from a unique technological feature that enables the synchronized switching between the light source and the camera. This mode of operation is referred to as synchronized gated imaging (SGI) or burst illumination (BIL). The active imaging systems mode eliminates the reflected backscatter of near range reflectors. A reflector may be an aerosol particle or any feature located within the field of view. The SGI mode of operation enables adjustments to the illumination level at each range resulting in an effective uniform illumination regardless of the range. The depth of field is a controllable feature of an active system, controlling the opening and closing of the camera and light source in a synchronized manner along the time line.

If the transparent atmosphere medium is clear there is no need for gating. When observing a target with known range with no obstacles along the line of sight there will be no reflections of close objects. When there are reflections from close objects, the gating technique eliminates the backscatter target contrast degradation.

Figure 1:
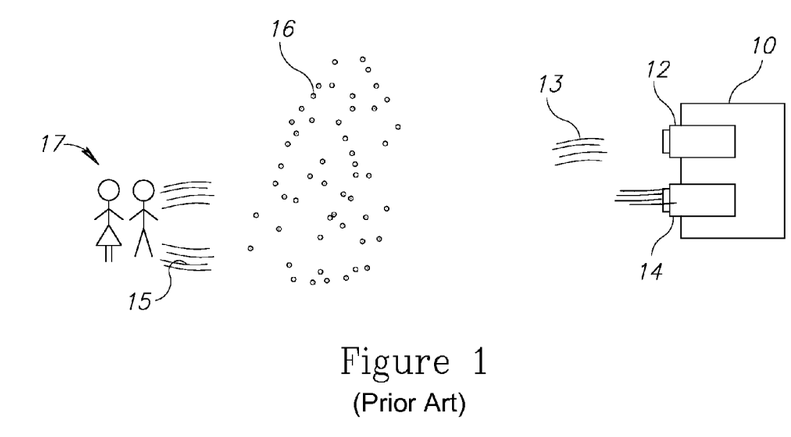
FIG. 1 is a schematic block diagram illustrating gated system according to the existing art.

FIG. 1 is a schematic block diagram illustrating the reflection due to an obstruction media according to the existing art. An exemplary gating imaging system 10 operates as follows: pulse of light (can be laser) 13 from illuminator 12 is radiated to the atmosphere. Some of the pulses backscatter from a disturbing medium 16. In order to eliminate the impact of the backscattering, the camera shutter 14 is closed when the backscattering radiance reaches it and the camera shutter opens when the pulse 14 returns after reflection from target 17.

There are several known methods in the art to design a gated imaging system. One method is based a single pulse per frame—in one camera frame time (normally for standard video about 30-40 msec) only one pulse of laser is radiated to the target. The camera is synchronized for the return of the pulse. Usually the laser has high energy per pulse and very narrow pulse width (~20-100 nsec). The implementation of this method compels the use of a detector so that its internal shutter has a response time in the order of micro seconds and possibly less.

Figure 2A:
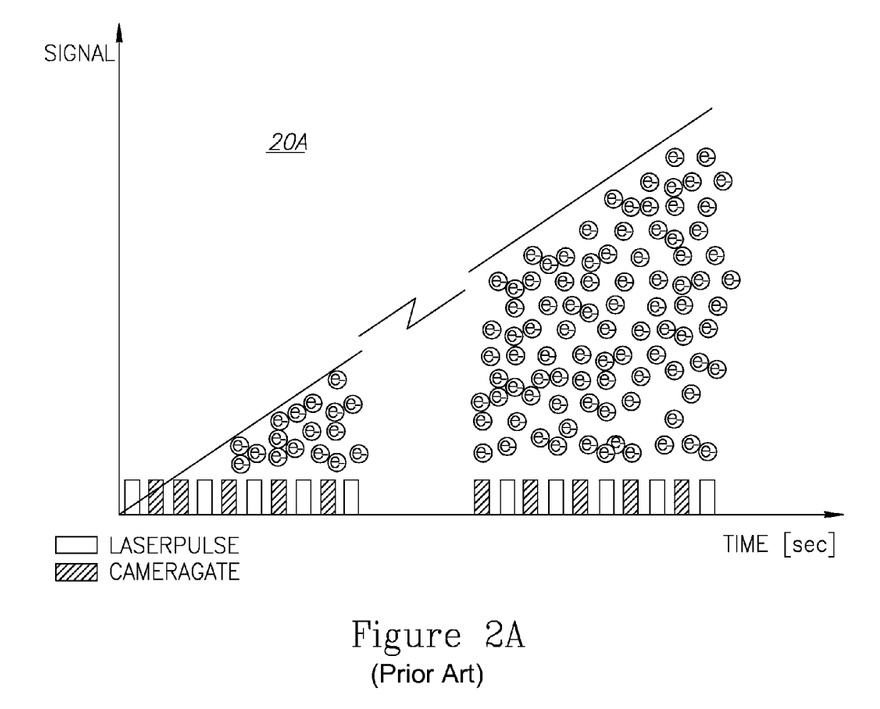
FIGS. 2A-2C are graph diagrams illustrating one aspect according to the existing art.

Another method is based on multiple pulses per frame—in one camera frame time multiple pulses of light (normally laser) are radiated to the target with time delay between one another. The camera is synchronized for the return of each pulse. The time delay between the gate "ON" duration of the camera and the radiation of the light source is depended on the distances to the observed scene. The duration of the "ON" time is also depended on the distance. The light source can be operated in high repetition rates (even up to mega hertz) with high average power and changeable pulse width (typically 100 nsec to 50 microsec for observation systems or even femto-second for very small depth of filed imaging). The implementation of this method compels the use of specific and unique types of detectors. This is because the internal shutter needs to be opened and closed in the same repetition rate of the light source (even up to mega hertz). The common sensors that are being used in a multiple gating system are ICMOS/ICCD/EBAPS (which has this capability). In these sensors the image intensifier (II) behaves as the shutter in front of the camera (The II has very fast shuttering capabilities). The spectral sensitivity is limited to the image intensifier sensitivity. This method is illustrated in FIG. 2A showing the timing scheme of the gating and the light source signal over time.

The laser and camera are synchronized in time. The depth of field and minimum range can be achieved by changing the synchronization and time scheme.

Figure 2B:
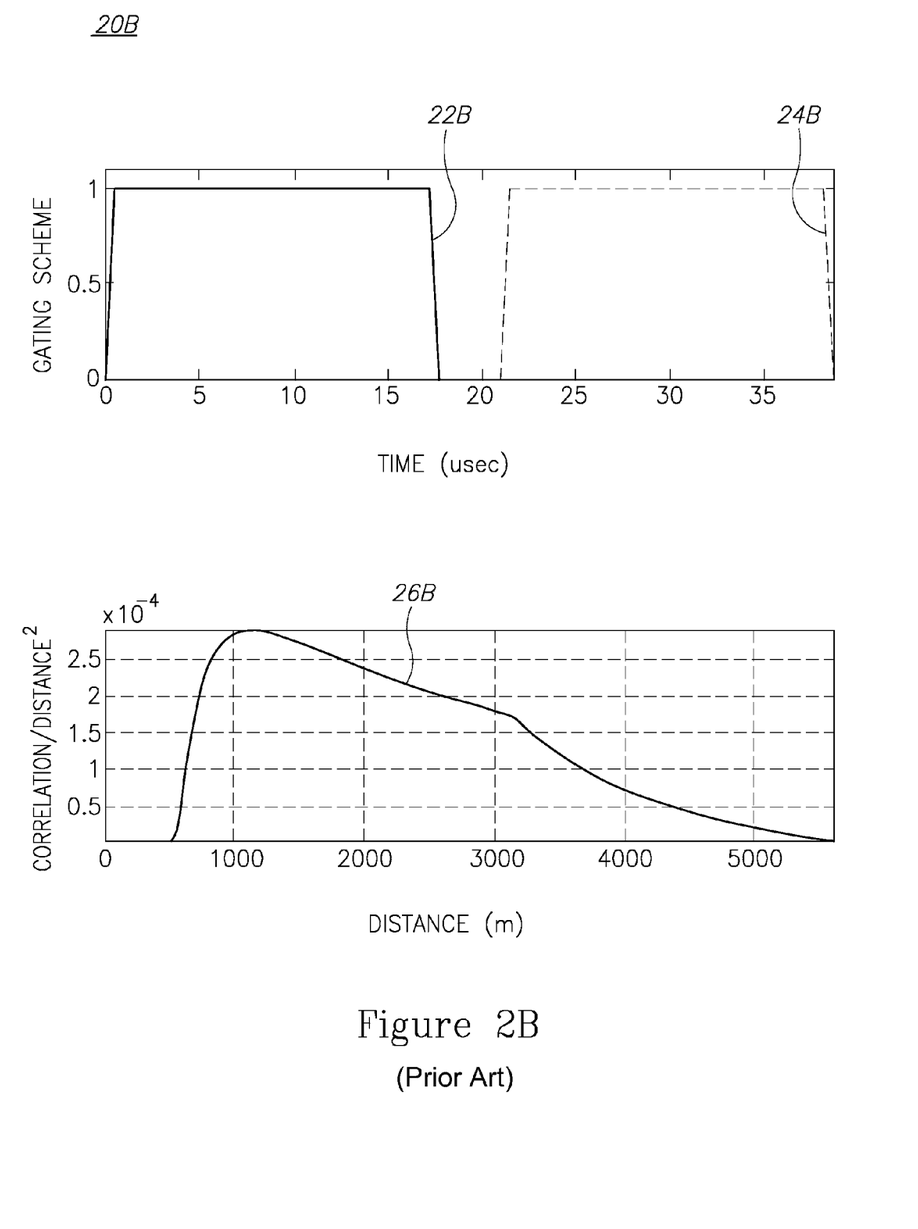
Figure 2C:
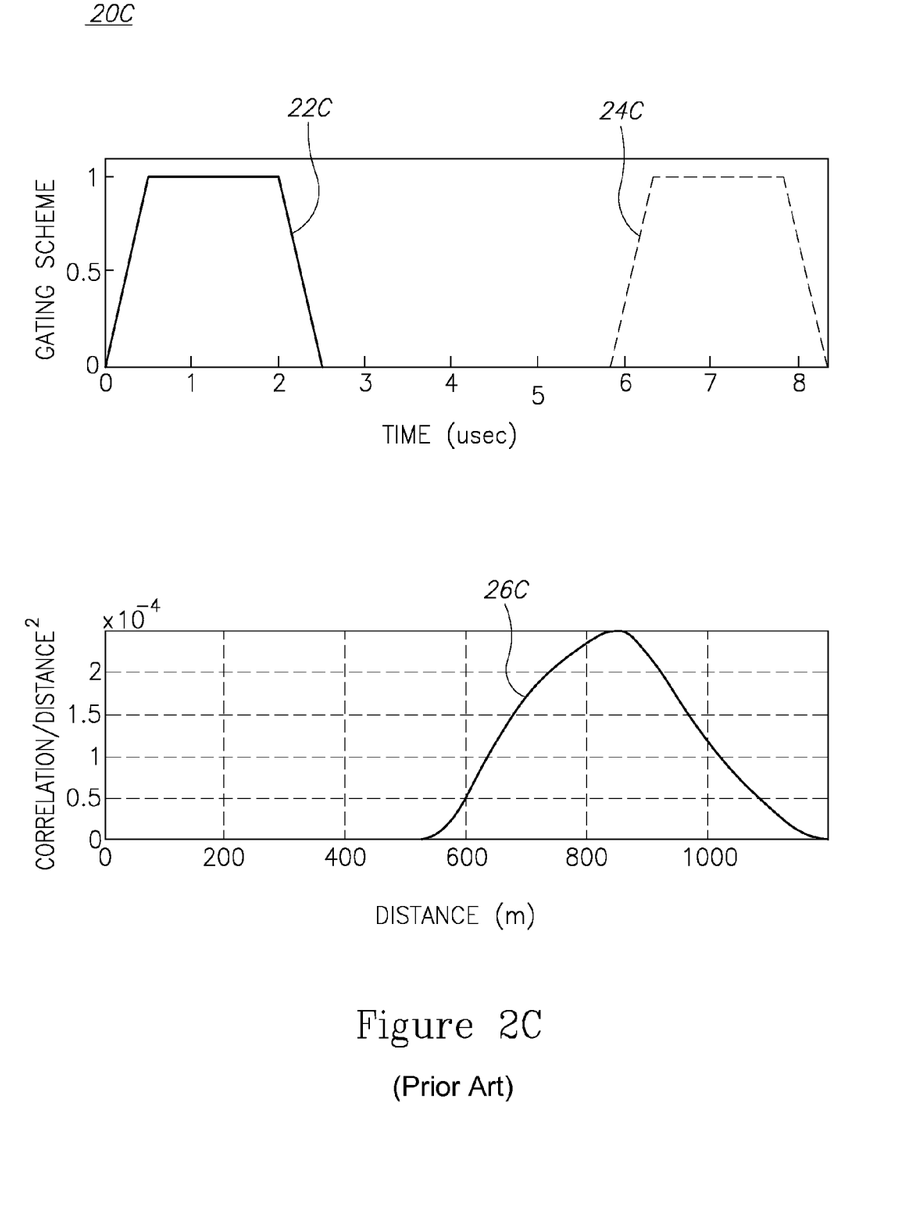

As illustrated in FIG. 2B and FIG. 2C, there is a possibility to change the depth of field and minimum range from frame to frame by playing with the timing. In this way a 3D video is achieved. The 3D video can be used for better understanding of the scene and the distance of detected objects. Moreover this method will produce better imaging performance—the illumination will be uniform over the entire depth of field. For every depth slice the illumination timing and power is optimized. All the slices can be combined to generate one image.

BRIEF SUMMARY

One aspect of the present invention provides a device for image gating using an array of reflective elements. The device includes an array of reflective elements, wherein each one of the reflective elements is movable within a range of a plurality of tilt positions, wherein the array is located at an image plane of the device, wherein the array is perpendicular to an optical axis of the device. The device further includes a control unit configured to control the reflective elements such that in at least some of the tilt positions, the reflective elements reflect the radiant flux at said image plane, to one or more planes projection planes (other than the focal plane of the optical device). A gradual rotation of the reflective elements along the plurality of tilt positions result in a gradual increase or decrease in the intensity of the image reflected from the array of reflective elements.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
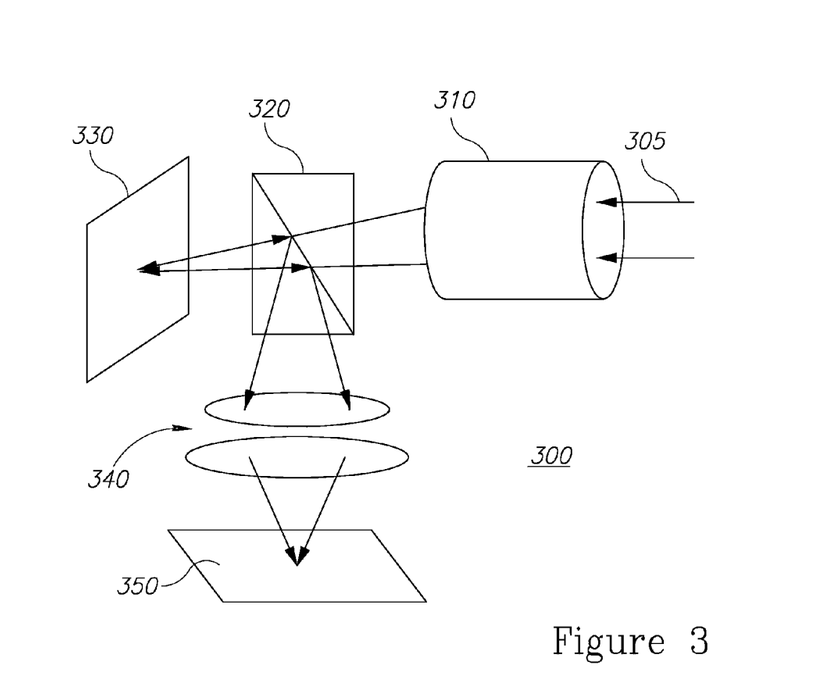
FIG. 3 is a schematic diagram illustrating the structure according to some embodiments of the present invention.

FIG. 3 is a schematic diagram illustrating a non-limiting exemplary structure of an optical device 300 according to some embodiments of the present invention. Optical device 300 includes a main lens 310 associated with an optical axis and an array of controllable reflective shutters 330 that are associated each with a first position and a second position. Array of reflective shutters 330 may be implemented in a non-limiting example as a digital micro mirror device (DMD) and is located at an image plane of the at least one main lens. Additionally, array 330 is further perpendicular to the optical axis thereof.

Optical device 300 further includes a one-way optical folding element 320 located between main lens 310 and array 330 and along the optical axis main lens. In a non limiting embodiment, one-way optical folding element 320 may be implemented as a total internal reflection (TIR) prism. Specifically, folding element 320 is configured to transfer light coming from main lens 310 and further to fold a light reflected from array 330 onto a second optical axis that is perpendicular to the optical axis of main lens 310.

Optical device 300 further includes one or more field lenses 340 located along the second optical axis and configured to focus light coming from folding element 320 onto a focal plane 350. Additionally, optical device 300 further includes a controller (not shown) operatively associated with array 330 of reflective shutters and configured to switch the reflective shutters between the first and the second position. At the first position, light coming through main lens 310 is reflected to folding element 320 and then focused by field lenses 340, yielding an image at focal plane 350. At the second position and during switching to and from the first position, light coming from main lens 310 is reflected off the second optical axis (this is the optical axis of the focal plane array 350 and the field lens 340).

Advantageously, by the aforementioned positioning of array 330 at the focal plane of main lens 310, the image produced and reflected upon focal plane 350 does not suffer from the diffraction effect of array 330. Because array 330 is at the focal plane all the reflected lobes due to the Brag effect are focused by field lenses 340 to respective focal points at focal plane 350.

Yet another advantage of the aforementioned positioning of array 330 at the focal plane of main lens 310 is that when the mirror rotates into their first and second positions, there is no smearing of the image on focal plane 350. Specifically, during movement, the rays that are folded onto field lenses 340 affect the formation of the image merely by changing the amount of energy of the image at focal plane 350, in other words, the image fades in and fades out but is not smeared.

Figure 4A:
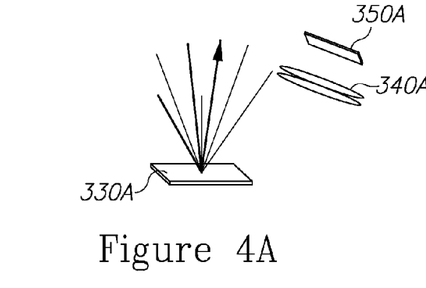
FIGS. 4A-4E are schematic diagrams illustrating one aspect according to some embodiments of the present invention.
Figure 4B:
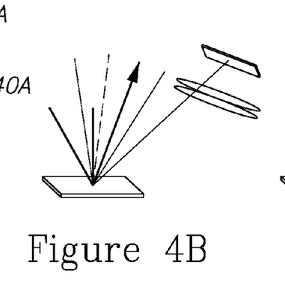
Figure 4C:
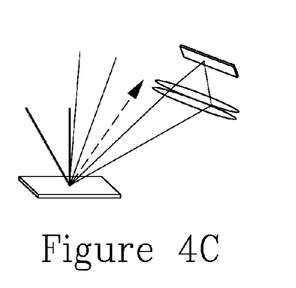
Figure 4D:
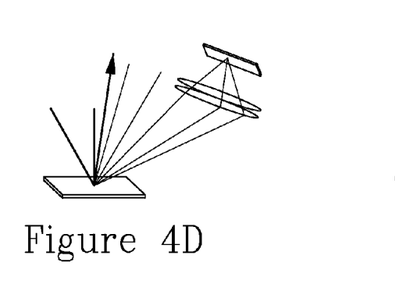
Figure 4E:
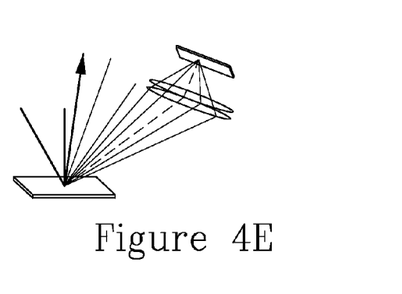

FIGS. 4A-4E are schematic diagrams illustrating one aspect according to some embodiments of the present invention. In FIG. 4A reflective shutters of array 330A are in the non-image forming position and no rays reach focal plane 350 at all. As the mirror rotate to the image forming position along FIGS. 4B, 4C, 4D and 4E more and more rays (lobes) of the light reflected from the reflective shutters reach field lenses 340A and then focal plane 350A. As explained above, the transient stage from the image forming position and non-image forming is characterized by a gradual change in the intensity of the image thus avoiding the undesirable side effect of image smearing.

Consistent with some embodiments of the present invention, optical device 300 may further have an array of optical sensors located at the focal plane 350 of field lens 340. The sensors may be of any wavelength and sensitivity in accordance with the optical properties of optical device 300 and the desired use thereof.

Consistent with some embodiments of the present invention, folding element 320 may be a beam splitter of any type and may also be implemented, by way of example, by a total internal reflection (TIR) prism, wherein the TIR prism is applied to light coming from array 330.

Consistent with some embodiments of the present invention, the main lens may be a photographic lens or a set thereof. In some embodiments, optical device 300 serves as a shutter mechanism for a camera. In some embodiments, the camera serves as a camera in an optical gated imaging system but other shutter-related applications may also be considered.

Figure 5:
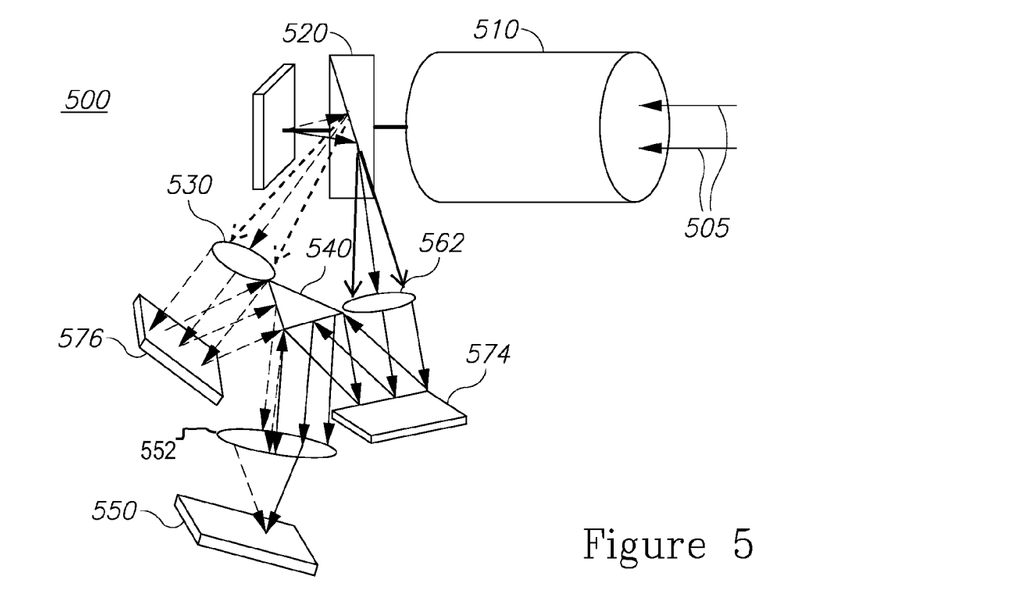
FIG. 5 is a schematic diagram illustrating the structure according to some embodiments of the present invention.

FIG. 5 is a schematic diagram illustrating the structure of device 500 according to some embodiments of the present invention. As shown herein, an alternative approach could be the use of the second state of the array of reflective shutters for gating using folding optics. FIG. 5 shows the reflections of light when the array of reflective shutters is in the $1^{st}$ position. In this approach the field lens 530 and 562 serve as two entrance apertures, whereas lens 552 serves as a single exit aperture (near the focal plane array). An inner folding mirror 540 is used between the first and second entrance field lens aperture. The inner folding of the light by the mirrors can be made only where the light is collimated, hence between the field lenses 530 and 562 defining focal plane 550. In this method the repetition rate of the entire system is doubled. The light source of light 505 travelling through main lens 510 and beam_splitter 520 is activated when the mirrors are in transition between the $1^{st}$ and $2^{nd}$ states. The exact synchronization between the light source on time and the arrival of the minors into position will determine the beginning of the depth of field. The on time in every state will determine the full depth of field. Once the depth of field is achieved-the array of reflective shutters rotates to the second position. Again, during the rotation the laser is pulsed on. This process is repeated.

Figure 6:
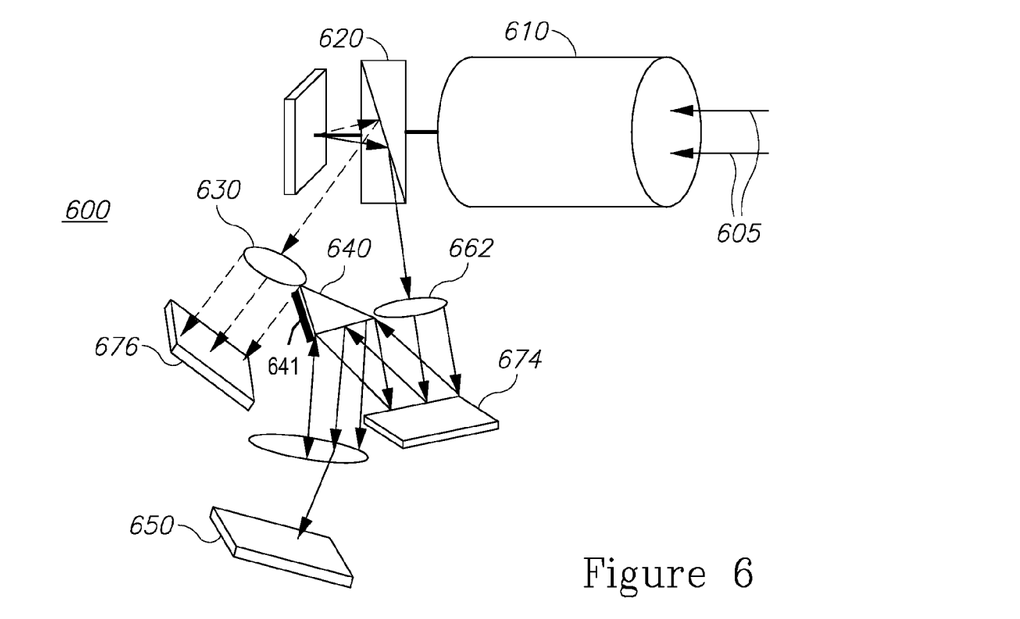
FIG. 6 is a schematic diagram illustrating the structure according to some embodiments of the present invention.

This method is effective mainly for the short range where the laser pulse is limited to the transition time between states. For larger ranges, one of the channels can be obstructed using (for example) a mechanical black foil 641 obstructing the mirror 640 or the first field lens 630 and 662 defining focal plane 650 as shown in FIG. 6 illustrating device 600 in which light 605 travels through main lens 610 and beam splitter 620. The foil 641 can be inserted in and out using a mechanical mechanism. The insertion does not need to be quick since the ranging is changed only on a frame level time.

Figure 7:
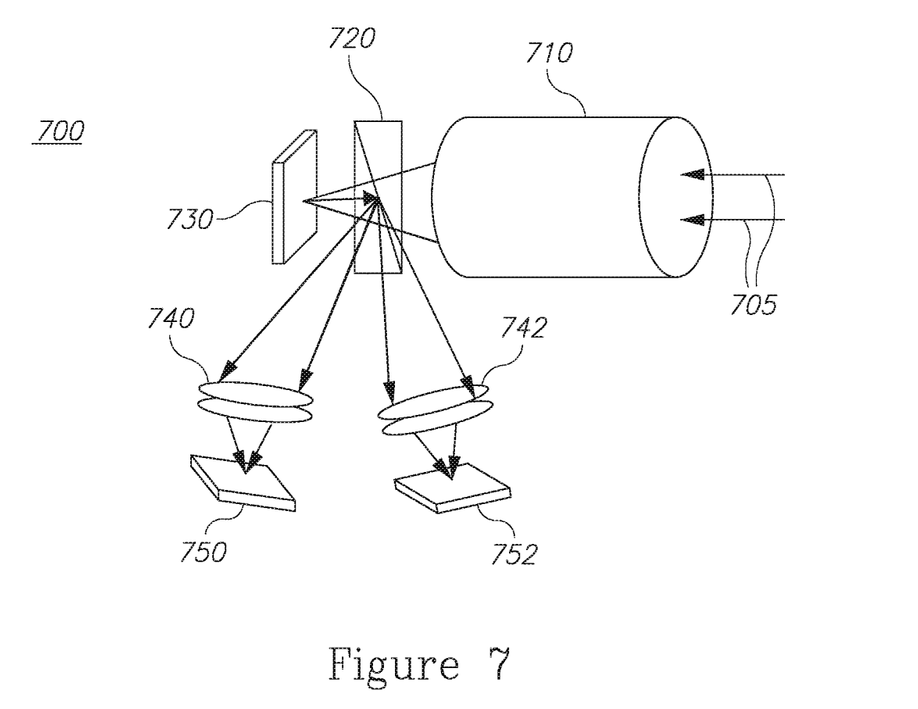
FIG. 7 is a schematic diagram illustrating the structure according to some embodiments of the present invention.

FIG. 7 is a schematic diagram illustrating the structure of device 700 which includes a main lens 710 and a beam splitter 720 though which light 705 travels, according to some embodiments of the present invention. For near distance or for increase of depth of field or for higher repetition rate of the array 730 of reflective shutters two focal plane arrays 750 and 752 can be used as follow. In FIG. 7 a focal plane array 750 is placed in the on position of the array of reflective shutters and a focal plane array 752 is placed in the off position. The dead time is when the array of reflective shutters is shifted along the plurality of the tilt positions. In this way both extreme states of the array of reflective elements can be used. The pulse of light is radiated while the array of reflective elements is "traveling" from one state to the other. In this method, double repetition rate may be achieved in a similar manner to the aforementioned embodiment of folding mirrors inside the field lens 740 and 742. This configuration can be used to increase the depth of field in the same frame for different reflective elements positions.

Figure 8A:
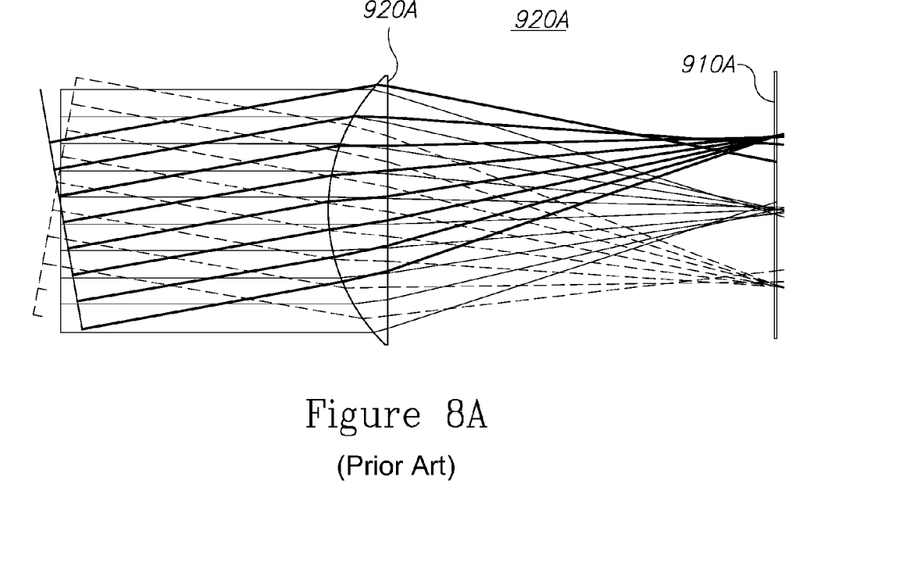
FIGS. 8A and 8B are graph diagrams illustrating one aspect according to some embodiments of the present invention.
Figure 8B:
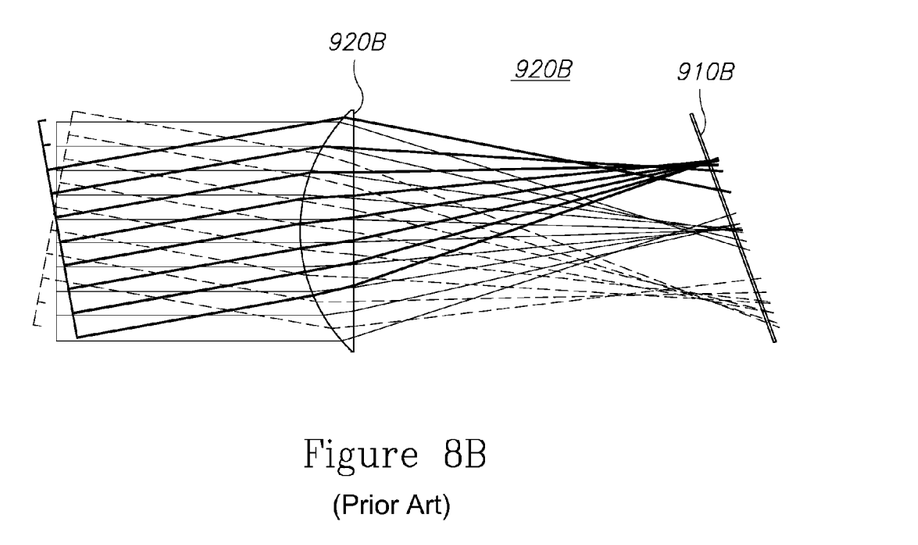

FIGS. 8A and 8B are graph diagrams illustrating one aspect according to the existing art. Specifically, the aforementioned requirement according to which reflective shutter array need to be perpendicular to the optical axis of the main lens is illustrated. As shown in FIG. 8A, when imaging large distance objects light reaches the optics relatively collimated. The lens 920A (corrected photographic lens) can focus the light into a focal plane 910A perpendicular to its optical axis. The size of the focal plane array and the focal length determines the field of view. However, if as shown in FIG. 8B, the focal plane array 910B is placed not perpendicular to the optical axis, the collimated light coming from different angles will not focus on the array. Possibly, some of the points may be where light will be focused, but surely not all of them will be in focus. In FIG. 8B the dashed rays does not focus on the focal plane array.

The reflective shutters are rotated slightly (in the order of microns) on the focal plane array and by so changing the reflected light angle. As shown in FIG. 8B the result of the rotation of the reflective shutters mechanical plane will result in the image being out of focus.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A gated imaging system comprising:
   a pulsed light source configured to generate a light pulse;
   at least one sensor;
   a main lens configured to focus a radiant flux of electromagnetic radiation from the pulsed light source entering the lens at a focal plane of the main lens;
   an array of tiltable reflective elements, located at the focal plane of the main lens, wherein the tiltable reflective elements have a $1^{st}$ position and a $2^{nd}$ position, being respectively extreme tilt positions of the tiltable reflective elements; and
   a control unit configured to selectively set the reflective elements, in said $1^{st}$ position and said $2^{nd}$ position, at each of which the reflective elements reflect the radiant flux focused at said focal plane, to the at least one sensor via a folding mirror other than the tiltable reflective elements,
   wherein the control unit is synchronized with the pulsed light source such that the pulsed light source is activated when the tiltable reflective elements are in transition between the 1st and 2nd positions.

2. The imaging system according to claim 1, further comprising one or more sets of field lens through which the radiant flux coming from the array of reflective elements is focused, and wherein the at least one sensor is located at a focal plane of the one or more sets of field lens.

3. The imaging system according to claim 1, further comprising one or more folding elements configured to fold the radiant flux reflected from the reflective elements onto the at least one sensor.

4. The imaging system according to claim 3, wherein the folding element is a beam splitter.

5. The imaging system according to claim 3, wherein the folding element is a total internal reflection (TIR) prism.

6. The imaging system according to claim 1, further comprising a photographic lens, wherein the array of the reflective elements is located at the focal plane of the photographic lens, and wherein the imaging system is configured to operate within an optical spectrum.

7. The imaging system according to claim 1, wherein in one of the $1^{st}$ or $2^{nd}$ tilt positions, the reflective elements are co-planar.

* * * * *